United States Patent [19]

McClure et al.

[11] Patent Number: 4,756,068

[45] Date of Patent: Jul. 12, 1988

[54] SHEARBAR ATTACHMENT AND ADJUSTMENT APPARATUS AND METHOD

[75] Inventors: John R. McClure; T. William Waldrop, both of New Holland, Pa.

[73] Assignee: New Holland Inc., New Holland, Pa.

[21] Appl. No.: 37,491

[22] Filed: Apr. 13, 1987

[51] Int. Cl.⁴ .............................................. B23P 11/00
[52] U.S. Cl. ......................................... 29/434; 29/514;
241/222; 241/241; 241/286
[58] Field of Search ...................... 29/434, 514, 526 R;
241/221-225, 239-241, 286, 287, 101.7

[56] References Cited

U.S. PATENT DOCUMENTS

| | | |
|---|---|---|
| 4,190,209 | 2/1980 | deBuhr et al. . |
| 4,295,616 | 10/1981 | Hill . |
| 4,436,248 | 3/1984 | Lindblom et al. . |
| 4,474,336 | 10/1984 | Fleming . |
| 4,506,839 | 3/1985 | Black . |
| 4,678,130 | 7/1987 | Martenas .............................. 241/222 |

Primary Examiner—Timothy V. Eley

Attorney, Agent, or Firm—Frank A. Seemar; Larry W. Miller; Darrell F. Marquette

[57] ABSTRACT

A shearbar attachment and adjustment apparatus is adapted to apply clamping forces to a shearbar in a forage harvester at first locations on opposite ends of the shearbar. The clamping forces prevent the shearbar from backing away from a rotary cutterhead in the forage harvester during chopping of crop material by passing cutting edges of knives on the periphery of the cutterhead close to the cutting edge of the shearbar. Also, the apparatus is adjustable to apply pulling forces on the shearbar at second locations on its opposite ends which are offset inwardly from the first locations. Application of pulling forces at these inward locations relative to the outward locations of the clamping forces tends to compensate for the effect of the convex shape of the shearbar cutting edge by causing bowing of the shearbar at the second locations to provide a more uniform clearance between the cutting edge of the shearbar and the cutting edges of the cutterhead knives.

9 Claims, 4 Drawing Sheets

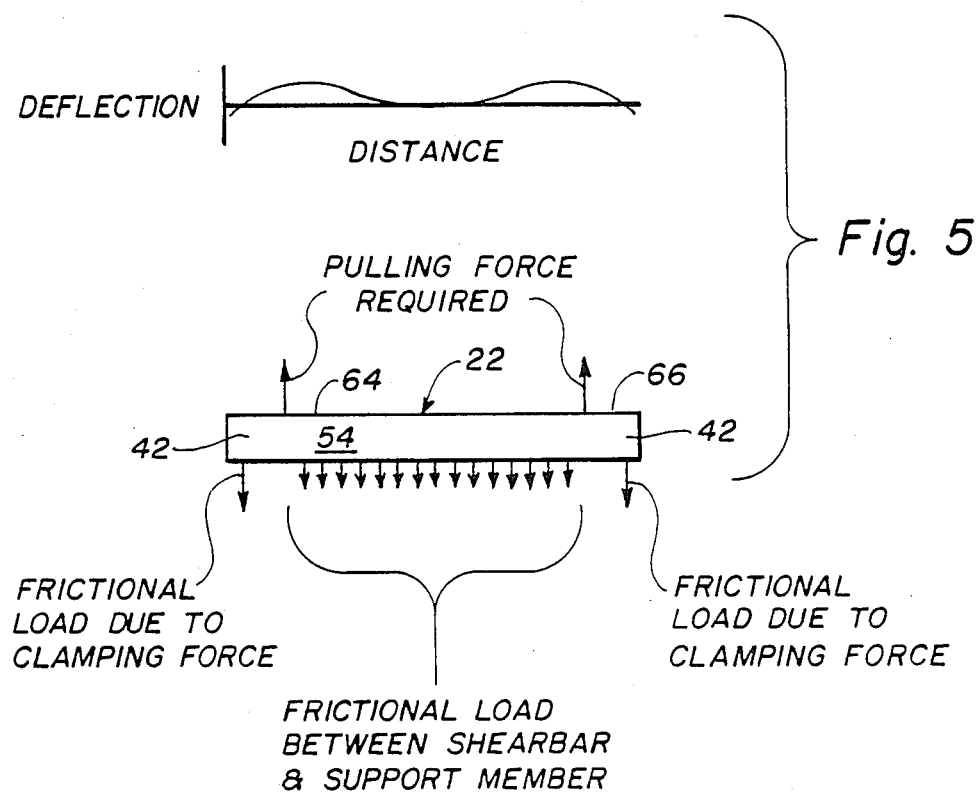

SHEARBAR ATTACHMENT AND ADJUSTMENT APPARATUS AND METHOD

CROSS REFERENCE TO RELATED APPLICATION

Reference is hereby made to the following copending U.S. patent application dealing with related subject matter and assigned to the assignee of the present invention: "Quick Adjusting Shearbar Mechanism" by Wayne B. Martenas, assigned U.S. Ser. No. 784,391 now U.S. Pat. No. 4,678,130 and filed Oct. 4, 1985.

BACKGROUND OF THE INVENTION

1. Field of the Invention

The present invention relates generally to forage harvesters and, more particularly, is concerned with apparatus and method for attaching and adjusting the positional relationship of a shearbar relative to a rotary cutterhead of the forage harvester.

2. Description of the Prior Art

In a forage harvester, typically, a header delivers crop material from the field in a generally rearward direction to feed rolls which form the crop material into a consolidated mat. The crop material mat is fed rearwardly by the feed rolls over the cutting edge on a stationary shearbar. Cutting edges on a plurality of knives peripherally arranged on a rotating cutterhead pass in close proximity to the shearbar cutting edge to chop the crop material mat into small pieces.

For maximum efficiency in the operation of the forage harvester and optimum quality of cut of the crop material, the shearbar should be positioned so that its cutting edge is as close to the passing cutting edges of the cutterhead knives as possible without ticking. Apparatus of some type is typically provided to adjust the position of the shearbar relative to the cutterhead which adjustment is generally required after each time the cutterhead knives are sharpened. Representative of the prior art are the adjustment apparatuses disclosed in deBuhr et al U.S. Pat. No. 4,190,209; Hill U.S. Pat. No. 4,295,616; Lindblom et al U.S. Pat. No. 4,436,248; Fleming U.S. Pat. No. 4,474,336; Black U.S. Pat. No. 4,506,839 and the patent application cross-referenced above.

Most desirably, for a uniformly high quality cut and to help keep the cutting edges of the knives in sharp condition, the shearbar-to-knife clearance should be constant throughout. This is difficult to achieve in practice for several reasons. One reason is that most shearbar adjustment apparatuses currently in use, such as those of the above-cited prior art, provide for adjustment of the shearbar by manipulation of components located remote from the shearbar. While providing a more convenient means for the operator to move the shearbar, the adjustment must be carried out without actually observing the shearbar-to-knife clearance. However, a procedure has evolved which alleviates much of the difficulty here. Briefly, the shearbar is moved toward the cutterhead, as the latter is turned slowly, until the knives thereon tick the shearbar lightly. When the knives begin to tick, the shearbar is then backed off from the cutterhead until the ticking stops.

The second reason for shearbar adjustment difficulty relates to the way in which the shearbar is commonly supported in the forage harvester. To explain, the shearbar is typically seated and fastened on a support member in such a way that the shearbar will be capable of withstanding the forces encountered during the chopping operation without backing away from the cutterhead. The approach is to ensure that a degree of contact is maintained between the shearbar and the support member along the entire length of the shearbar that is sufficient to create frictional forces therealong capable of countering the chopping force.

One known way to provide such degree of contact of the shearbar with the support member is to configure the support member with a convex or crowned upper surface. When the shearbar is then fastened to the support member, the shearbar becomes clamped against the support member and actually bows or bends slightly into an arched shape in seating over the crowned top surface of the support member and thereby provides good contact over the entire length of the shearbar. However, it has been found that, due to the bending, the shearbar-to-cutterhead clearance varies significantly, being less at the middle of the shearbar than at its opposite ends, along the length of the shearbar. This results in reduction of the uniformity of cut and, frequently, of the harvester cutting efficiency.

The above-cited Black patent attempts to overcome the aforementioned negative side effects associated with purposely bending the shearbar in fastening it to the crowned support member by machining a concavity in the cutterhead-facing shearbar surface. The concavity is designed to compensate for the effect of the convexity of the upper shearbar surface by placing the opposite portions of the cutting edge defined by the intersection of the two nonplanar surfaces closer to the cutterhead and thereby positioning the overall nonlinear cutting edge at a more uniform clearance from the cutterhead.

However, the solution of the Black patent appears to have certain significant shortcomings. First, it will surely increase the cost of fabricating the shearbar since machining the concavity introduces additional costly manufacturing steps. Second, the benefits of a permanent concavity will only be realized over an initial short portion of the ordinary useful life of the shearbar. The preformed concavity only reduces the clearance problem initially. Once normal wear to the shearbar distorts the original configuration of the concavity, it can no longer provide the means by which the shearbar can be adjusted to a uniform clearance with the cutterhead.

An optimum solution for resolving the difficulty of adjusting the shearbar to a uniform clearance from the cutterhead does not appear to reside in any of the adjustment apparatuses of the above-cited prior art. Consequently, a need still exists for a different approach to resolving of this difficulty.

SUMMARY OF THE INVENTION

The present invention provides a shearbar attachment and adjustment apparatus and method designed to satisfy the aforementioned needs. Pulling forces are applied to the shearbar at locations on the opposite end portions of the shearbar which are offset inwardly from the locations where the clamping forces are applied. Application of pulling forces at these inward locations relative to the outward locations of the clamping forces tends to compensate for the effect of the convex shape of the shearbar cutting edge and provide a more uniform clearance between the cutting edge of the shearbar and the cutting edges of the cutterhead knives. Unlike the approach taken in the above-cited Black patent, the approach herein facilitates maintainance of a substantially uniform clearance between the shearbar and cutterhead throughout the useful life of the shearbar and does not require machining the shearbar to form a concavity therein during manufacturing thereof.

Accordingly, the present invention is directed to a shearbar attachment and adjustment apparatus incorporated in a forage harvester. The forage harvester includes a rotatable cutterhead, a shearbar having a cutting edge, and a stationary shearbar support member having a bowed upper surface. The cutterhead has a plurality of knives with cutting edges which pass in close proximity to the shearbar cutting edge upon rotation of the cutterhead in chopping crop material passing over the shearbar.

The shearbar attachment and adjustment apparatus includes attachment means fastening the shearbar to, and upon the bowed upper surface of, the support member at first locations on opposite end portions of the shearbar and outwardly from opposite sides of the cutterhead. Such fastening permits movement of the shearbar relative to the support member toward and away from the cutterhead for adjusting the position of the shearbar cutting edge relative to the support member toward and away from the cutterhead for adjusting the position of the shearbar cutting edge relative to the cutting edges of the cutterhead knives. The attachment means, in fastening the shearbar upon the bowed upper surface of the support member, applies clamping forces to the shearbar at the first locations which bend the shearbar into contact with the bowed upper surface of the support member along the length of the shearbar and, in turn, deform the upwardly-facing surface of the shearbar to a convex configuration and generate frictional forces between the shearbar and the support member, being sufficient to resist movement of the shearbar toward and away from the cutterhead due to chopping forces imposed on the shearbar. The convex configuration of the upwardly-facing shearbar surface defines a corresponding convexity in the shearbar cutting edge such that, when the shearbar is disposed generally parallel with the cutterhead, opposite end edge portions of the shearbar cutting edge are disposed farther from the cutterhead than an intermediate edge portion of the shearbar cutting edge. In such manner, an undesirable nonuniform clearance exists between the cutting edge of the shearbar and the cutting edges of the cutterhead knives as the latter pass the shearbar cutting edge.

The shearbar attachment and adjustment apparatus further includes adjustment means disposed outwardly of the opposite sides of the cutterhead and being coupled to the shearbar at second locations being spaced inwardly from the first locations and outwardly of the opposite sides of the cutterhead. The adjustment means is operable to apply pulling forces on the shearbar at the second locations which are sufficient to overcome the resisting frictional forces and cause movement of the shearbar toward the cutterhead and concurrently bowing of the shearbar and the cutterhead-facing surface thereon at the second locations so as to displace the opposite end edge portions of the shearbar cutting edge more nearly at the same distance from the cutterhead as the intermediate edge portion thereof, whereby a more uniform clearance can be adjustably achieved between the cutting edge of the shearbar and the cutting edges of the cutterhead knives.

The present invention also relates to a method of attaching and adjusting the shearbar which comprises the steps of: (a) attaching the shearbar to, and upon the bowed upper surface of, the support member at first locations on opposite end portions of the shearbar and outwardly from opposite sides of the cutterhead so as to permit movement of the shearbar relative to the support member toward and away from the cutterhead for adjusting the position of the shearbar cutting edge relative to the cutting edges of the cutterhead knives; (b) applying clamping forces to the shearbar at the first locations which bend the shearbar into contact with the bowed upper surface of the support member along the length of the shearbar and, in turn, deform the upwardly facing surface of the shearbar to a convex configuration and generate frictional forces between the shearbar and the support member being sufficient to resist movement of the shearbar toward and away from the cutterhead due to chopping forces imposed on the shearbar, the convex configuration of the upwardly-facing shearbar surface defining a corresponding convexity in the shearbar cutting edge such that, when the shearbar is disposed generally parallel with the cutterhead, opposite end edge portions of the shearbar cutting edge are disposed farther from the cutterhead than at an intermediate edge portion of the shearbar cutting edge, whereby a nonuniform clearance exists between the cutting edge of the shearbar and the cutting edges of the cutterhead knives as the latter pass the shearbar cutting edge; (c) adjusting the shearbar by applying pulling forces thereon at second locations being spaced inwardly from the first locations and outwardly of the opposite sides of the cutterhead, the pulling forces being sufficient to overcome the resisting frictional forces and cause movement of the shearbar toward the cutterhead and concurrently bowing of the shearbar and the cutterhead-facing surface thereon at the second locations so as to displace the opposite end edge portions of the shearbar cutting edge more nearly at the same distance from the cutterhead as the intermediate edge portion thereof, whereby a more uniform clearance can be adjustably achieved between the cutting edge of the shearbar and the cutting edges of the cutterhead knives.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5 is a schematical top plan view of the shearbar with arrows representing the distribution of frictional forces there along and a graph of the deflection of the shearbar after application of pulling forces thereto in accordance with the principles of the present invention.

DETAILED DESCRIPTION OF THE INVENTION

Figure 1:
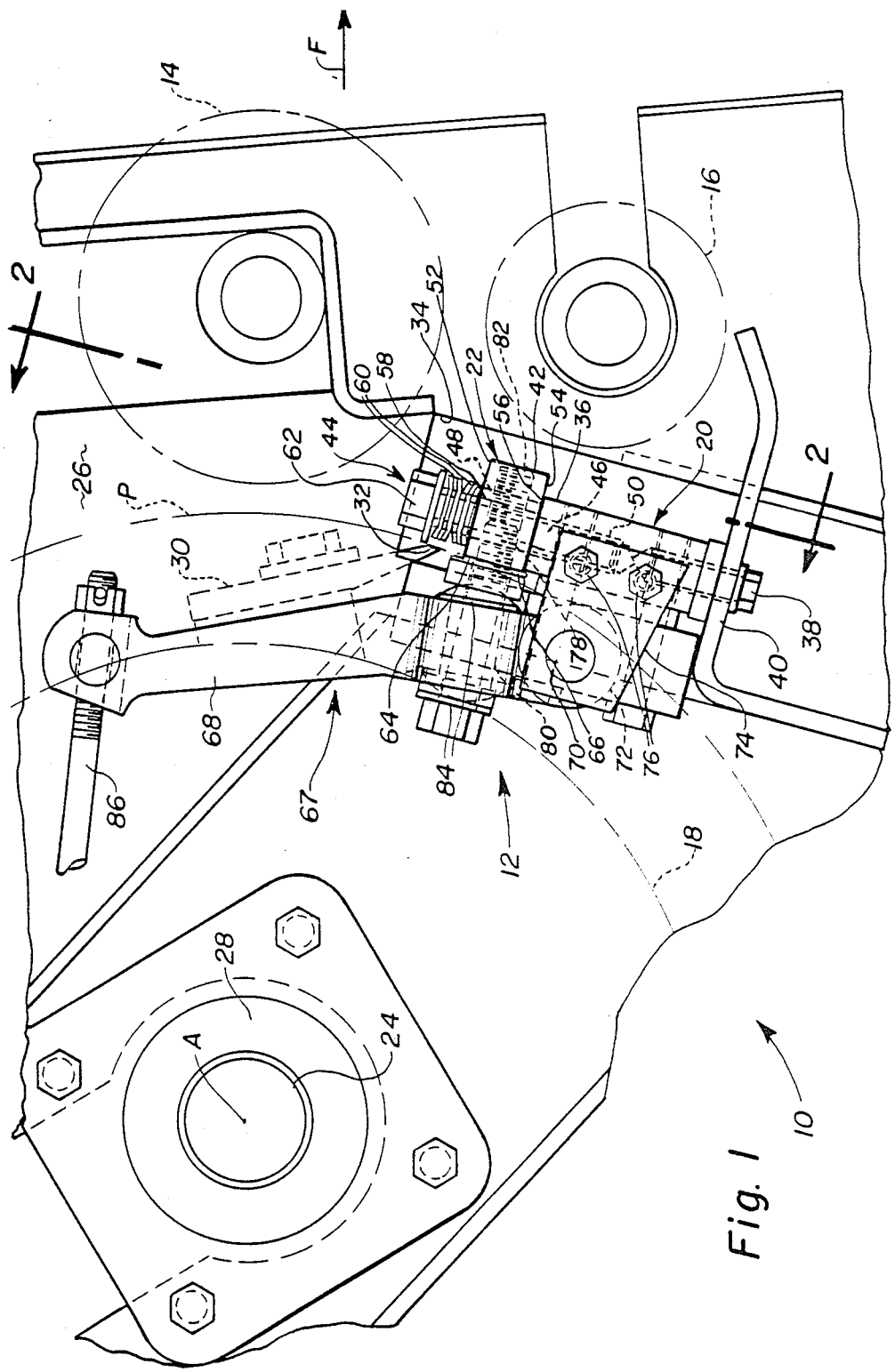
FIG. 1 is a side elevational view of a fragmentary portion of a forage harvester cutterhead assembly with which is associated the shearbar attachment and adjustment apparatus of the present invention.

In the following description, like reference characters designate like or corresponding parts throughout the several views. Also in the following description, it is to be understood that such terms as "forward", "left", "upwardly", etc., are words of convenience and are not to be construed as limiting terms.

Referring now to the drawings, and particularly to FIG. 1, there is shown a fragmentary portion of one side of a forage harvester cutterhead assembly, generally designated 10, which incorporates the shearbar attachment and adjustment apparatus 12 of the present invention. As is conventional in a forage harvester, a header (not shown) delivers crop material from a field in a generally rearward direction to and between counter-rotatably driven upper and lower feed rolls 14,16 which form the crop material into a consolidated mat. The crop material mat is fed rearwardly by the feed rolls 14,16 to the cutterhead assembly 10.

The cutterhead assembly 10 basically includes a generally cylindrical cutterhead 18, an elongated shearbar support member 20 and an elongated shearbar 22. The cutterhead 18 is rotatably mounted at its opposite ends 24 (only one end being shown) to opposite side sheets 26 (only one being shown) of the forage harvester by bearing assemblies 28. The cutterhead 18 is driven by suitable conventional drive train (not shown) to rotate about a generally horizontal axis A which extends transverse to the direction of forward travel, as represented by the arrow F in FIG. 1. A plurality of knives 30 having cutting edges 32 are detachably mounted in a peripheral arrangement about the circumference of the cutterhead 18.

Figure 2:
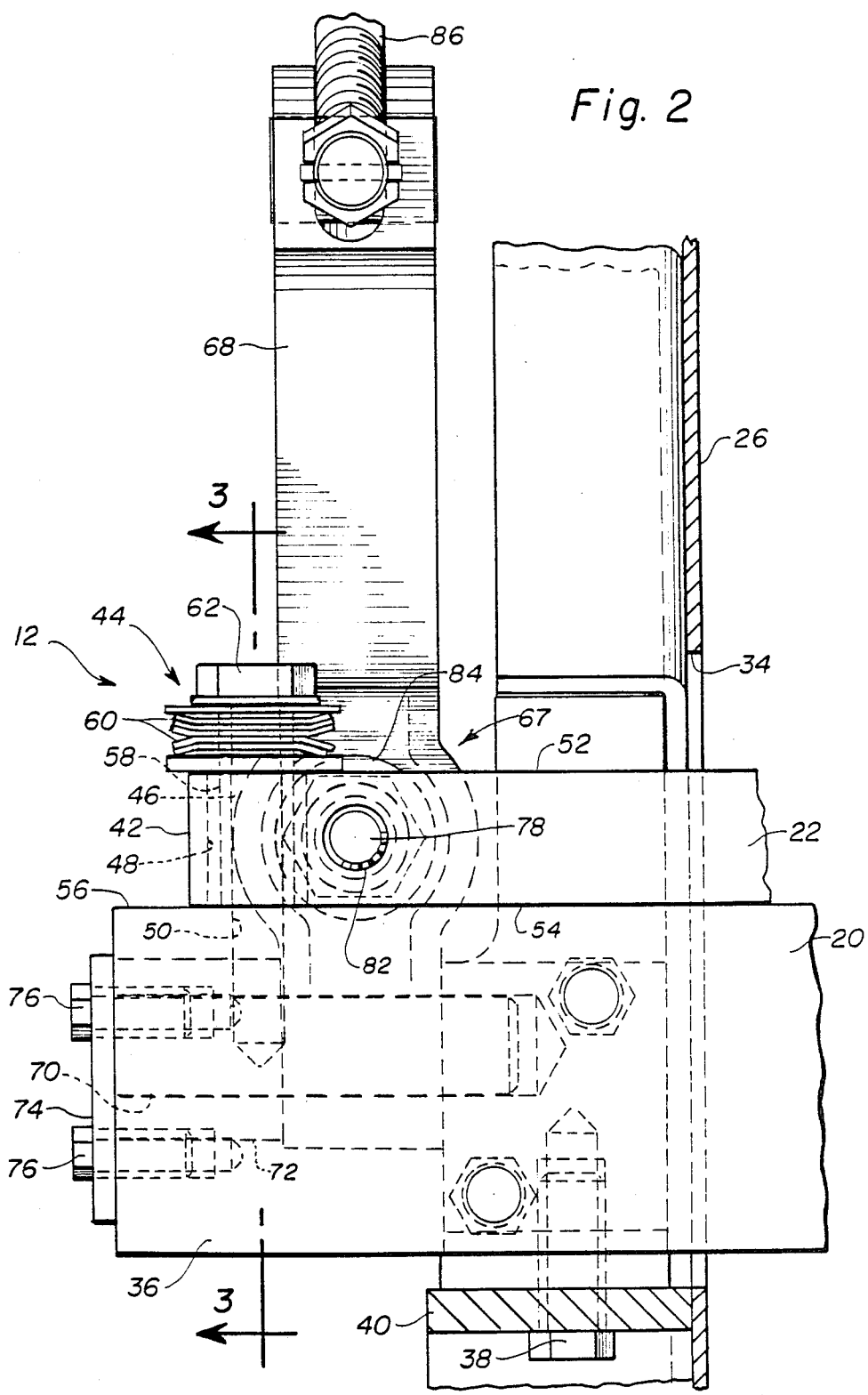
FIG. 2 is an enlarged front elevational view, partly in section, of the shearbar attachment and adjustment apparatus at one end of the shearbar, as seen along line 2—2 of FIG. 1.
Figure 3:
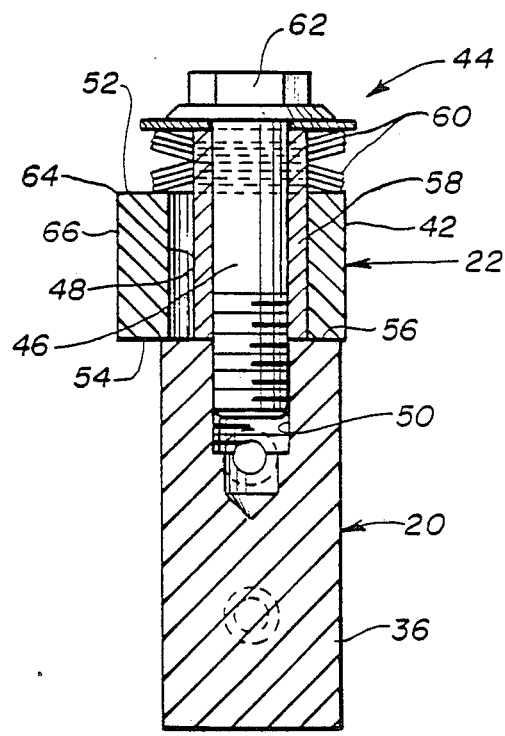
FIG. 3 is a cross-sectional view of a portion of the shearbar attachment and adjustment apparatus taken along line 3—3 of FIG. 1.

Both the support member 20 and shearbar 22 of the cutterhead assembly 10 extend between, and project outwardly through openings 34 in, the side sheets 26 at positions generally forwardly of and along the cutterhead 18. As seen in FIGS. 1 and 2, inwardly from each of its opposite ends 36 but outwardly of the respective side sheet 26, the support member 20 is rigidly attached by a bolt 38 to a brace 40 affixed to the side sheet. As best shown in FIGS. 2 and 3, the shearbar 22 is fastened at each end 42 (only one end being shown) by suitable attachment means, generally indicated by 44, of the shearbar attachment and adjustment apparatus 12 to one end 36 of the stationary support member 20. Each attachment means 44 takes the form of a clamping bolt 46 which extends through an opening 48 defined through the end of the shearbar 22 and is threaded into an internally threaded vertical bore 50 tapped in the corresponding end 36 of the support member 20. The shearbar opening 48 extends between upper and lower surfaces 52,54 of the shearbar 22 and has a substantially larger diameter than that of the clamping bolt 46. The support member bore 50 opens at an upper surface 56 of the support member 20 for receiving the externally-threaded lower end of the bolt 46. Also, a cylindrical spacer 58 and a stack of precision disc springs 60 encircle the bolt 46 between it upper head 62 and the upper surface 52 of the shearbar 22. The spacer 58 acts to limit the clamping force which can be applied to the shearbar 22 when the bolt 46 is tightened down on the shearbar against springs 60.

The shearbar 22 has a cutting edge 64 defined by the intersection of its upper surface 52 with a rear surface 66 thereon which faces toward the cutterhead 18 and extends downwardly from the upper surface 52 to the lower surface 54 thereof. (As is well known, another cutting edge may be similarly defined on the opposite longitudinal side of the shearbar for use after the one cutting edge 64 has worn down.) The crop material mat fed rearwardly by the upper and lower feed rolls 14,16 to the cutterhead assembly 10 passes over the upper surface 52 and thus also over the cutting edge 64 of the shearbar 22 before reaching the knives 30 on the cutterhead 18. The cutting edges 32 on the knives 30, being peripherally arranged on the rotating cutterhead 18, pass along a circular path P which brings them into close proximity to the shearbar cutting edge 64 to chop the crop material mat into small pieces.

Due to the arrangement of the components of the attachment means 44 as described earlier and the configuration of the support member 20 which will now be described, the shearbar 22 is seated and clamped on the upper surface 56 of the support member 20 in such a way that the shearbar 22 will be capable of withstanding the level of forces normally encountered during the chopping operation without backing away from the cutterhead 18 and its knives 30. Specifically, as shown in exaggerated form in FIG. 4, the upper surface 56 of the support member 20 has a slightly convex or crowned configuration. When the shearbar 22 is then fastened to the support member 20 by the clamping bolts 46, the shearbar 22 becomes clamped against the support member 20 and actually bows or bends slightly into an arched shape in seating over the crowned upper surface 56 of the support member 20 and thereby provides good contact with the support member over the entire length of the shearbar. Thus, a degree of contact is maintained between the shearbar 22 and the support member 20 along the entire length of the shearbar that is sufficient to create frictional forces therealong capable of countering the chopping force. The magnitude and distribution of such frictional forces are represented in FIG. 5 by the arrows pointing downwardly from the shearbar 22.

Figure 4:
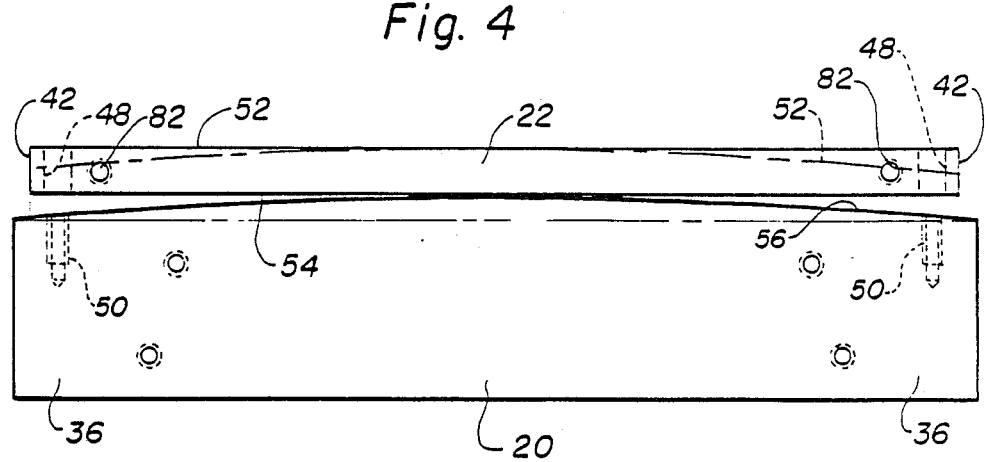
FIG. 4 is a front elevational view of the shearbar and its support member, illustrating in exaggerated form the upper crowned surface on the support member and the respective solid-line straight and broken-line bowed configurations of the shearbar before and after it is fastened on the upper surface of the support member.

As a consequence of bowing or bending the shearbar 22 to clamp it to the support member 20, its upper surface 52 is thereby deformed from a generally planar to a slightly convex configuration, as seen in dashed outline in FIG. 4. This also deforms the configuration of the cutting edge 64 of the shearbar 22 from generally linear to convex. So now instead of the cutting edge 64 running substantially parallel along the cutterhead 18, it assumes a convex configuration in which its opposite end edge portions are lower than its intermediate edge portion. The opposite edge portions of the shearbar cutting edge now diverge away from a generally transverse horizontal line on the cutterhead tangent to the middle of the shearbar edge. This relationship places the opposite end edge portions of the shearbar cutting edge 64 farther away from the cutterhead than the middle or intermediate edge portion which results in creation of a nonuniform clearance between the cutting edge 64 of the shearbar 22 and the cutting edges 32 of the cutterhead knives 30 as the latter pass through the aforementioned tangent horizontal line on the cutterhead 18. However for maximum efficiency in the operation of the forage harvester and optimum quality of cut of the crop material, the shearbar 22 should be positioned so that its cutting edge 64 is in close noncontacting relation to the passing cutting edges 32 of the cutterhead knives 30, but at a substantially uniform distance therefrom from one end of the shearbar cutting edge 64 to the other.

Even though the shearbar 22 is clamped along its entire length to the support member 20, the arrangement of the components of the attachment means 44 as described earlier permit sliding movement of the shearbar 22 toward and away from the cutterhead 18 for adjusting the position of the shearbar cutting edge 64 relative to the cutting edges 32 of the cutterhead knives 30. For applying the necessary pulling forces on the opposite ends 42 of the shearbar 22 to slidably adjust it into a generally parallel relationship with the cutterhead 18, the shearbar attachment and adjustment apparatus 12 also includes adjustment means, generally designated 67 and best seen in FIGS. 1 and 2.

The components of the adjustment means 67 are per se substantially identical to those disclosed in the U.S. patent application cross-referenced above. However, the locations at which the adjustment means 67 applies the necessary pulling forces to the shearbar opposite ends 42 relative to the locations at which the clamping forces are applied thereto by clamping bolts 46 of the attachment means 44 are different. In the cross-referenced application, the pulling forces are applied at locations which are in line with or are the same as the locations at which the clamping forces are applied. Thus, the applied pulling forces are aligned in direct opposition to the high frictional forces created at the shearbar ends 42 between the shearbar 22 and the support member 20 by the clamping forces. With such alignment, the pulling forces can have no corrective effect on the above-described problem of a nonuniform clearance existing between the shearbar cutting edge 64 and the cutting edges 32 of the cutterhead knives 30.

However, by coupling the adjustment means 67 to the shearbar 22 to apply the pulling forces on the opposite ends 42 thereof at locations spaced inwardly from the locations of application of the clamping forces, not only is the desired sliding movement of the shearbar 22 toward the cutterhead 18 brought about, but concurrently a bowing or deflection of the shearbar 22 and its rear cutterhead-facing surface at such inwardly offset locations is brought about, as is seen in FIG. 5. These deflections at the locations of pulling force application displaces the shearbar at these locations toward the cutterhead 18 by a greater amount than at the middle of the shearbar. As a result the opposite end edge portions of the shearbar cutting edge 64 become positioned closer to the cutterhead 18 and thus more nearly at the same distance from the cutterhead as the intermediate edge portion of the shear bar cutting edge. Now, a more uniform clearance can be adjustably achieved between the cutting edge 64 of the shearbar 22 and the cutting edges 32 of the cutterhead knives 30.

The adjustment means 67 of the shearbar attachment and adjustment apparatus 10, being located adjacent each side of the cutterhead 18, includes a lever 68 pivotally supported on each respective side sheet 26 about a pivot member 70. The pivot member 70 is supported by a collar 72 connected to the respective side sheet 26 via bracket 74 detachably affixed to the support member 20 by a pair of fasteners 76. The lever 68 is thus pivotally movable in generally a fore-and-aft direction generally parallel to and along the exterior of the side sheet 26.

Each respective lever 68 (only one being shown) is coupled to one end 42 of the shearbar 22 at a location spaced inwardly from the location of the clamping bolt 46 by a capscrew 78 extending through an oversized opening 80 in the lever and into threaded engagement with an internally-threaded hole 82 through the shearbar end 42. A pair of cooperable cup and ball washers 84 positioned on opposing sides of the lever 68 give a "ball joint" effect to permit a positional rotation of the lever relative to the corresponding capscrew 78, allowing a generally linear motion of the shearbar 22 and engaged capscrew 78 while the lever 68 is pivoted about its pivot member 70.

As best seen in FIG. 1, manipulation of actuation linkage 86 in a known manner from the exterior of the forage harvester causes pivotal movement of the respective lever 68 about its pivot member 70. The relative rotational movement between the cup and ball washers 84, creating the ball joint effect, permits the lever 68 to be rotatably moved about its pivot member 70 and concurrently apply the required pulling force on the capscrew 78 connected to the shearbar end 42 to affect a substantially linear motion of the shearbar 22 between the support member 20 and the spacer 58 on the clamping bolt 46 which goes through the shearbar. As mentioned earlier, due to the location of the capscrew 78 inwardly of the clamping bolt 46, this motion not only permits adjustment of the cutting edge 64 of the shearbar 22 relative to the cutting edges 32 of the revolving knives 30, but also bends or deflects the shearbar at the location of the capscrew 78 toward the cutterhead 18 which allows establishment of a more uniform clearance between the shearbar 22 and cutterhead 18 than was possible heretofore. Application of pulling forces at these inwardly offset locations relative to the outward locations of the clamping forces tends to compensate for the effect of the convex shape of the shearbar cutting edge 64 and provide a more uniform clearance between it and the cutting edges 32 of the cutterhead knives 30.

It is thought that the shearbar attachment and adjustment apparatus of the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. In a forage harvester including a rotatable cutterhead, a shearbar having a cutting edge, and a stationary shearbar support member having a bowed upper surface, said cutterhead having a plurality of knives with cutting edges which pass in close proximity to said shearbar cutting edge upon rotation of said cutterhead in chopping crop material passing over said shearbar, a shearbar attachment and adjustment method comprising the steps of:

(a) attaching said shearbar to, and upon said bowed upper surface of, said support member at first locations on opposite end portions of said shearbar and outwardly from opposite sides of said cutterhead so as to permit movement of said shearbar relative to said support member toward and away from said cutterhead for adjusting the position of said shearbar cutting edge relative to said cutting edges of said cutterhead knives;

(b) applying clamping forces to said shearbar at said first locations which bend said shearbar into contact with said bowed upper surface of said support member along the length of said shearbar and, in turn, deform said upwardly-facing surface of said shearbar to a convex configuration and generate frictional forces between said shearbar and said support member being sufficient to resist movement of said shearbar toward and away from said cutterhead due to chopping forces imposed on said shearbar, said convex configuration of said upwardly-facing shearbar surface defining a corresponding convexity in said shearbar cutting edge such that, when said shearbar is disposed generally parallel with said cutterhead, opposite end edge portions of said shearbar cutting edge are disposed farther from said cutterhead than at an intermediate edge portion of said shearbar cutting edge, whereby a nonuniform clearance exists between said cutting edge of said shearbar and said cutting edges of said cutterhead knives as the latter pass said shearbar cutting edge;

(c) adjusting said shearbar by applying pulling forces thereon at second locations being spaced inwardly from said first locations and outwardly of said opposite sides of said cutterhead, said pulling forces being sufficient to overcome said resisting frictional forces and cause movement of said shearbar toward said cutterhead and concurrently bowing of said shearbar and said cutterhead-facing surface thereon at said second locations so as to displace said opposite end edge portions of said shearbar cutting edge more nearly at the same distance from said cutterhead as said intermediate edge portion thereof, whereby a more uniform clearance can be adjustably achieved between said cutting edge of said shearbar and said cutting edges of said cutterhead knives.

2. In a forage harvester including a rotatable cutterhead, a shearbar having a cutting edge, and a stationary shearbar support member having a bowed upper surface, said cutterhead having a plurality of knives with cutting edges which pass in close proximity to said shearbar cutting edge upon rotation of said cutterhead in chopping crop material passing over said shearbar, a shearbar attachment and adjustment apparatus comprising:

(a) attachment means fastening said shearbar to, and upon said bowed upper surface of, said support member at first locations on opposite end portions of said shearbar and outwardly from opposite sides of said cutterhead so as to permit movement of said shearbar relative to said support member toward and away from said cutterhead for adjusting the position of said shearbar cutting edge relative to said cutting edges of said cutterhead knives, said attachment means, in fastening said shearbar upon said bowed upper surface of said support member, applying clamping forces to said shearbar at said first locations which bend said shearbar into contact with said bowed upper surface of said support member along the length of said shearbar and, in turn, deform said upwardly-facing surface of said shearbar to a convex configuration and generate frictional forces between said shearbar and said support member being sufficient to resist movement of said shearbar toward and away from said cutterhead due to chopping forces imposed on said shearbar, said convex configuration of said upwardly-facing shearbar surface defining a corresponding convexity in said shearbar cutting edge such that, when said shearbar is disposed generally parallel with said cutterhead, opposite end edge portions of said shearbar cutting edge are disposed farther from said cutterhead than at an intermediate edge portion of said shearbar cutting edge, whereby a non-uniform clearance exists between said cutting edge of said shearbar and said cutting edges of said cutterhead knives at the latter pass said shearbar cutting edge; and (b) adjustment means disposed outwardly of said opposite sides of said cutterhead and being coupled to said shearbar at second locations being spaced inwardly from said first locations and outwardly of said opposite sides of said cutterhead, said adjustment means being operable to apply pulling forces on said shearbar at said second locations which are sufficient to overcome said resisting frictional forces and cause movement of said shearbar toward said cutterhead and concurrently bowing of said shearbar and said cutterhead-facing surface thereon at said second locations so as to displace said opposite end edge portions of said shearbar cutting edge more nearly at the same distance from said cutterhead as said intermediate edge portion thereof, whereby a more uniform clearance can be adjustably achieved between said cutting edge of said shearbar and said cutting edges of said cutterhead knives.

3. The apparatus as recited in claim 2, wherein said attachment means includes:

means defining an opening in each opposite end portion of said shearbar at said first location therealong which opening extends between said upwardly-facing surface and a downwardly-facing surface thereof;

a fastener extending through each of said openings of said shearbar and fastened to said support member, said fastener being adapted to apply said clamping force on said shearbar at said first location but being smaller in diameter than said opening for permitting movement of said shearbar toward and away from said cutterhead.

4. The apparatus as recited in claim 3, wherein said attachment means includes means mounted on said fastener for limiting said clamping force applied to said shearbar when said fastener is fastened to said support member.

5. The apparatus as recited in claim 2, wherein said adjustment means includes:

a lever pivotally mounted at outwardly of each opposite side of said cutterhead adjacent said each opposite end portion of said shearbar; and interconnecting means pivotally mounted to each said lever and rigidly connected to said shearbar at each opposite end portion there at said second location therealong being offset inwardly from said first location, whereby upon selected pivotal movement of said lever said interconnecting means applies said pulling force to said respective shearbar end portion at said second location.

6. In a forage harvester including a rotatable cutterhead, a shearbar having a cutting edge defined by the intersection of a pair of generally orthogonal surfaces thereon one of which faces generally upwardly and the other of which extends downwardly from said one surface and faces toward said cutterhead, and a stationary shearbar support member having a bowed upper surface, said cutterhead having a plurality of knives peripherally arranged thereon with cutting edges which pass in close proximity to said shearbar cutting edge upon rotation of said cutterhead in chopping crop material passing over said shearbar, a shearbar attachment and adjustment apparatus comprising:

(a) attachment means disposed and defined adjacent opposite end portions of said shearbar outwardly of opposite sides of said cutterhead and fastening said shearbar to said support member at first locations along said shearbar opposite end portions and upon said bowed upper surface of said support member so as to permit sliding movement of said shearbar relative to said support member toward and away from said cutterhead for adjusting the position of said shearbar cutting edge relative to said cutting edges of said cutterhead knives, said attachment means, in fastening said shearbar upon said bowed upper surface of said support member, applying clamping forces to said shearbar opposite end portions at said first locations therealong which bend said shearbar into contact with said bowed upper surface of said support member along the length of said shearbar and, in turn, deform said upwardly-facing surface of said shearbar to a convex configuration and generate frictional forces between said shearbar and said support member, said frictional forces extending generally orthogonal to said cutterhead-facing shearbar surface and being distributed along the length of said shearbar and sufficient to resist movement of said shearbar toward and away from said cutterhead due to chopping forces imposed on said shearbar, said convex configuration of said upwardly-facing shearbar surface defining a corresponding convexity in said shearbar cutting edge such that, when said shearbar is slidably adjusted into a generally parallel relationship with said cutterhead, opposite end edge portions of said shearbar cutting edge are disposed in a divergent fashion farther from said cutterhead than at an intermediate edge portion of said shearbar cutting edge located between said opposite end edge portions thereof, whereby a nonuniform clearance exists between said cutting edge of said shearbar and said cutting edges of said cutterhead knives as the latter pass said shearbar cutting edge; and (b) adjustment means disposed outwardly of and adjacent to said opposite sides of said cutterhead and being coupled to said opposite end portions of said shearbar at second locations there along spaced inwardly from said first locations and outwardly of said opposite sides of said cutterhead, said adjustment means being operable to apply pulling forces on said shearbar at said second locations therealong which are sufficient in magnitude to overcome said resisting frictional forces and cause sliding movement of said shearbar toward said cutterhead and concurrent bowing of said shearbar and said cutterhead-facing surface thereof at said second locations so as to displace the same toward said cutterhead by a greater amount than said shearbar intermediate portion such that said opposite end edge portions of said shearbar cutting edge become positioned more nearly at the same distance from said cutterhead as said intermediate edge portion thereof, whereby a more uniform clearance can be adjustably achieved between said cutting edge of said shearbar and said cutting edges of said cutterhead knives.

7. The apparatus as recited in claim 6, wherein said attachment means includes:

means defining an opening in each opposite end portion of said shearbar at said first location therealong which opening extends between said upwardly-facing surface and a downwardly-facing surface thereof;

a fastener extending through each of said openings of said shearbar and fastened to said support member, said fastener being adapted to apply said clamping force on said shearbar at said first location but being smaller in diameter than said opening for permitting movement of said shearbar toward and away from said cutterhead.

8. The apparatus as recited in claim 7, wherein said attachment means includes means mounted on said fastener for limiting said clamping force applied to said shearbar when said fastener is fastened to said support member.

9. The apparatus as recited in claim 8, wherein said adjustment means includes:

a lever pivotally mounted at outwardly of each opposite side of said cutterhead adjacent said each opposite end portion of said shearbar; and interconnecting means pivotally mounted to each said lever and rigidly connected to said shearbar at each opposite end portion there at said second location therealong being offset inwardly from said first location, whereby upon selected pivotal movement of said lever said interconnecting means applies said pulling force to said respective shearbar end portion at said second location.

* * * * *